J. P. CROWLEY.
METHOD OF AND APPARATUS FOR CUTTING SHEET GLASS.
APPLICATION FILED FEB. 2, 1917.

1,377,320.

Patented May 10, 1921.
7 SHEETS—SHEET 4.

Inventor
Joseph P. Crowley

By Whittemore Hulbert & Whittemore
Attys

UNITED STATES PATENT OFFICE.

JOSEPH P. CROWLEY, OF TOLEDO, OHIO, ASSIGNOR TO THE LIBBEY-OWENS SHEET GLASS COMPANY, OF TOLEDO, OHIO, A CORPORATION OF OHIO.

METHOD OF AND APPARATUS FOR CUTTING SHEET-GLASS.

1,377,320.

Specification of Letters Patent.

Patented May 10, 1921.

Application filed February 2, 1917. Serial No. 146,065.

*To all whom it may concern:*

Be it known that I, JOSEPH P. CROWLEY, a citizen of the United States of America, residing in the city of Toledo and State of Ohio, have invented certain new and useful Improvements in Methods of and Apparatus for Cutting Sheet-Glass, of which the following is a specification, reference being had therein to the accompanying drawings.

The invention consists of a machine for cutting sheet glass into strips or into rectangles and is shown as applied in cutting up a sheet of glass which is drawn continuously from the tank and fed through the leer and out of the leer upon the cutting table. The invention further consists in the construction of a mechanism for making longitudinal cuts or scores in the glass; in mechanism for making transverse cuts; in mechanism for cracking the sheet along the cut lines; and in the feeding and holding devices for the sheet; all as more fully hereinafter described and particularly set forth in the claims.

The sheet drawing mechanism may be of any suitable construction, it forming no part of the present invention. It may be of the type shown in Patent No. 1,160,692, issued November 16, 1915, if desired.

At the present time glass is being drawn in sheet form continuously by the so-called Colburn process, with apparatus substantially as shown in the patent previously herein referred to; the glass being first drawn vertically and, while still plastic, bent over a roller into a horizontal plane and drawn on a flat horizontal run, passing into and through the leer and upon a cutting table at the discharge end of the leer. At this point it is ordinarily cut by hand by transverse cuts and carried away to a cutting table where it is cut up into sheets of the desired size.

My invention is intended to make longitudinal cuts in the sheet, cutting off the edges of the sheet which are marred in the drawing operation or which may be uneven, and also, if desired, cutting the sheet into strips so that by proper transverse cuts sheets of the desired size may be made. Combined with these devices for making longitudinal cuts I provide a transverse cutter together with mechanism for causing it to cut at variable times so that the transverse cuts may be made at any desired point for varying the size of the sheets, the longitudinal cutters being adjustable to vary the width of the sheet.

1 shows the end of the leer from which the sheet, drawn in the manner previously described, emerges in flat form. At the discharge end of the leer is a frame, 2, upon which is an endless carrier, 3, passing over sprocket-wheels, 4, at opposite ends, the wheels being on shafts, 5 and 6, respectively. The upper run of the chain passes over a flat frame-work, 7, holding that run horizontal and in line with the sheet as it emerges from the leer. The sprocket-chain 3 is synchronized, by suitable drive mechanism, with the drive mechanism for the leer carrier; this I have shown as effected by means of a drive mechanism comprising sprocket-chains, 7' driven from the leer carrier drive, driving a shaft 8, which in turn, by means of the sprocket-wheel, 9, and interposed worm-wheels 10 and 11 on the shaft 5, drive the left-hand shaft 5 and sprocket-wheels thereon and thus guide the endless table or carrier.

Figures 2, 23:
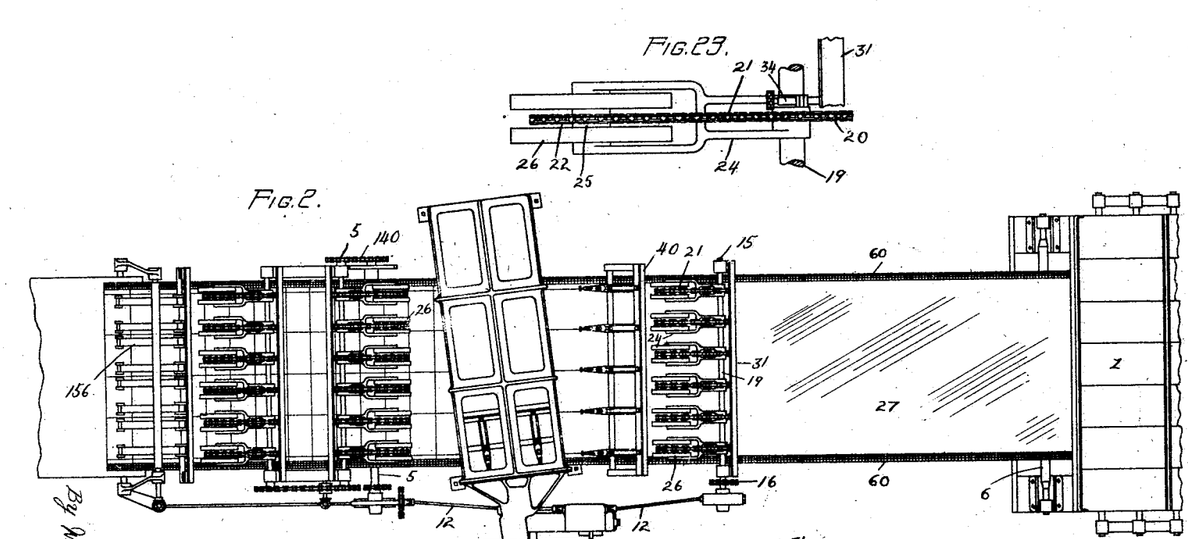
Fig. 2 is a plan view thereof.
Fig. 23 is an enlarged plan of one of the feed wheels.
Figure 24:
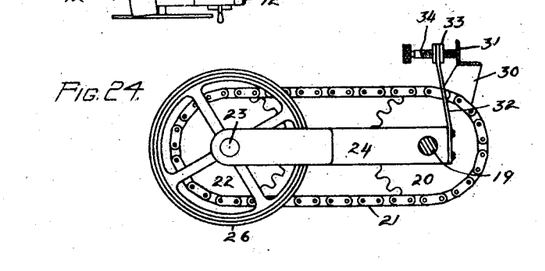
Fig. 24 is an enlarged side elevation thereof.

Leading back from the worm-shaft 10 driven by the sprocket 9 is a shaft, 12, coupled by universal joint to the worm-shaft 10. This shaft has an irregular path rearward, permitted by suitable universal joints, and at its rear end is provided with a worm, 13, meshing with a worm-wheel, 14, on a shaft, 15, transverse to the machine. Upon this shaft 15 is a sprocket-wheel, 16, (Fig. 2) over which passes a sprocket-chain, 17, engaging a sprocket wheel, 18, on a shaft, 19, arranged transversely to the machine above the feed-table. Upon this shaft are a series of sprocket-wheels, 20, over which pass sprocket-chains, 21, engaging sprocket-wheels, 22; each of these sprocket-wheels 22 being carried by short shafts, 23, held in the end of frames, 24, journaled on the shaft 19 and at their outer ends forked to embrace sprocket-wheels 22, as plainly shown in Figs. 24 and 23. The sprocket-wheels 22 are on the hubs 25, of the drive-wheels 26, the sprocket-wheels being of lesser diameter than the drive-wheels which are preferably felt-faced and rest upon the upper surface of the sheet of glass, 27, as shown in Fig. 2. The weight of the sprocket-wheels, chains and frame 24 give the necessary grip to the drive-wheels 26 to feed the glass forward and prevent any slipping due to the retarding effect of the cutters—which will shortly be described.

Supported on brackets, 30, is a cross-bar, 31, (Figs. 2 and 24,) and fastened to the inner end of each of the frames 24 is a flat spring, 32, extending up beside the bar 31 and provided with an eye in which is a nut, 33, through which passes a screw, 34, bearing at its end against the bar 31. By adjusting this screw in or out the weight or friction of the drive-wheels 26 upon the glass may be nicely adjusted, so as to get just the proper grip and prevent any slipping.

Figures 8, 10, 12:
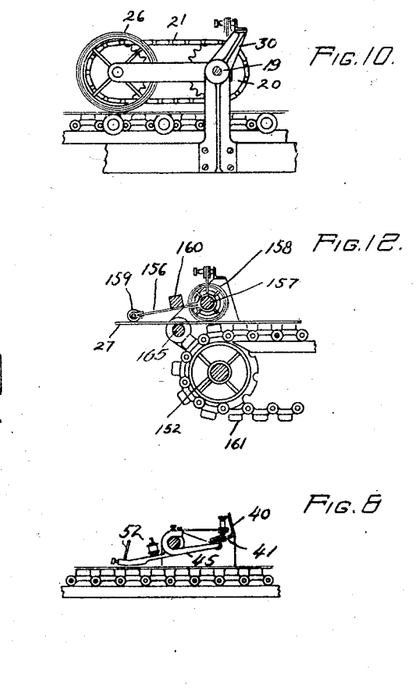
Fig. 8 is an enlarged side elevation of one of the strip cutters.
Fig. 10 is an enlarged side elevation of one of the feed rolls, showing the drive mechanism therefor.
Fig. 12 is an enlarged longitudinal section through the end of the feed table, showing the means for depressing the sheet to crack it on the transverse cuts.
Figure 9:
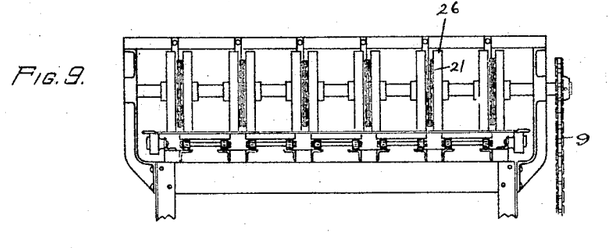
Fig. 9 is a vertical section through the feed table, on line 9—9 of Fig. 3.
Figure 11:
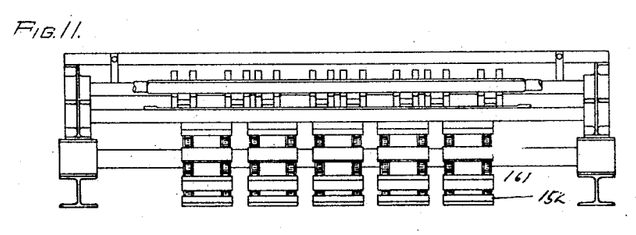
Fig. 11 is a vertical section on line 11—11 of Fig. 3, looking to the left.
Figures 13, 14, 15, 16, 17, 18, 19:
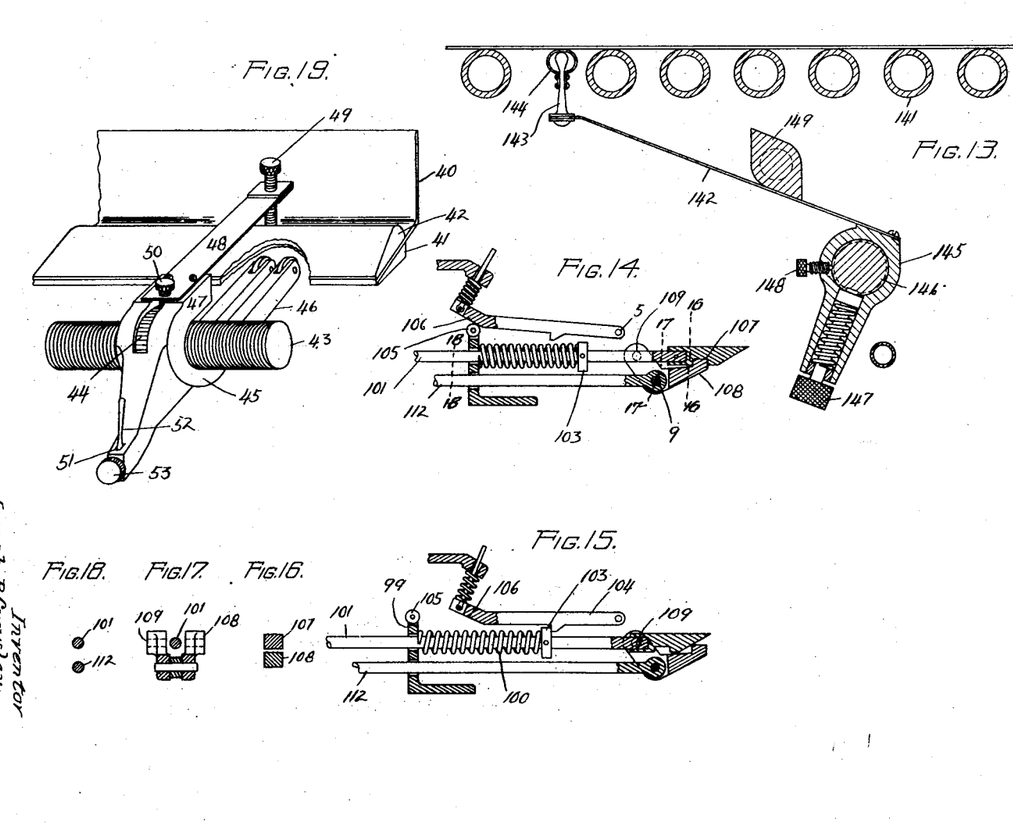
Fig. 13 is a longitudinal section through the feed table, enlarged, and illustrating the construction of the hammer and its actuating mechanism for cracking the sheet along the longitudinal lines.
Fig. 14 and Fig. 15 are sectional elevations showing in different positions push-bars and trip mechanism on the transverse cutter.
Figs. 16, 17 and 18 are cross-sections on lines 16—16, 17—17 and 18—18 of Fig. 14.
Fig. 19 is a perspective of one of the longitudinal cutters and its support.

Forward of the wheels 26, supported upon suitable brackets, is a cross-bar, 40, shown in Figs. 2, 8 and 19. This cross-bar has a horizontal portion, 41, and a shoulder or ledge, 42 (Fig. 19). Just beyond and parallel with the bar 40 is a shaft, 43, provided with screw-threads on its periphery, and engaging this screw-shaft are collars, 44, (Fig. 19). These collars are adjustable on the screw-shaft to any desired point.

Detachably engaging over the shaft 43 and the collar 44 is a U-shaped cutter-frame, 45, shown particularly in Figs. 8 and 19. One arm, 46, of this U-shaped frame projects beneath the horizontal portion 41 of the bar 40, and the other arm, 47, has attached to its upper face a spring, 48, which at its outer end is provided with an adjusting screw, 49, engaging beyond the ledge or shoulder 42—and thus holding the cutter frame in position on the shaft but permitting a transverse adjustment of the cutter, such adjustment being effected by turning the collar 44. When proper adjustment for the cutter is obtained, the collar is locked by means of a set-screw, 50, engaging the serrated face of the collar and being screwed through the spring 48.

At the outer end of the cutter-arm is a socket, 51, in which is inserted an ordinary glass cutter tool, 52, held in position by means of a set-screw, 53. This tool is provided with a cutting instrument such as a diamond, at its lower end, and bears upon the upper surface of the glass with a tension which may be varied by adjustment of the screw 49. It will be obvious that if a series of these cutters are placed in position as the sheet is fed through the machine longitudinal cuts or scores will be made on the surface of the glass, the same as glass is cut by a tool in the hand of an operator. These cuts may be made to any desired point in the sheet, there being one at each side to cut off the edges, 60, of the sheet, which in the Colburn machine are marked by the edge rollers used to maintain the width of the sheet as it is drawn from the tank. Intermediate cutters may be placed at any desired point to make longitudinal cuts, according to the width of the strip or sheet desired. I have shown in Fig. 2 three intermediate cutters and two edge cutters so that the edges will be cut off and the sheet will be cut into longitudinal strips.

It is obvious, of course, that the intermediate cutters may be omitted if a sheet of full width is desired or that more cutters may be added and adjusted to any desired point if the sheet is to be cut into narrower strips. It is desirable usually, where the sheet is cut into strips longitudinally, to cut these strips transversely, so that rectangular ones of the desired size will be cut.

I will now proceed to describe the construction of the transverse cutter or cutters: Supported on suitable standards, 61, outside of the main frame of the machine, is a transverse frame, 59, extending above and across the glass sheet, preferably beyond the longitudinal cutters. I have shown this arranged at a slight diagonal, as will be seen from Fig. 2, so that the resultant cut will be straight, owing to movement of the sheet.

Figures 4, 25:
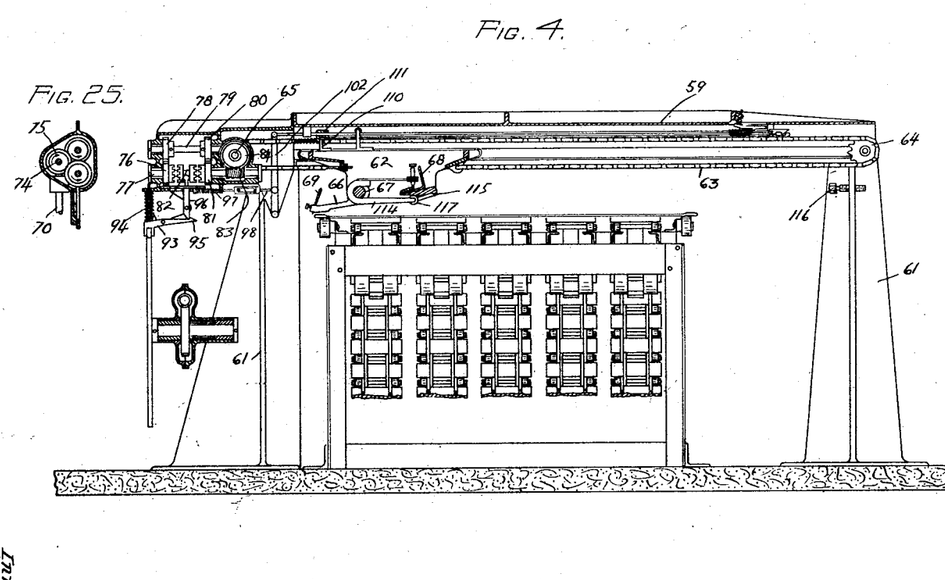
Fig. 4 is a transverse section centrally through the transverse cutting mechanism.
Fig. 25 is an end view of the drive gears shown at the left of Fig. 4.

Supported on suitable guides in this cross-frame is a cutter carriage, 62 (Fig. 4), to one side of which is fastened one end of a sprocket-chain, 63, which passes over sprocket-wheels, 64, on one end and over a sprocket-wheel at the other end (not shown) secured to a drive-shaft, 65; the end of the sprocket-chain being secured, as shown in Fig. 4, at the opposite end of the cutter carriage. This cutter carriage is drawn forward and back across the sheet intermittently, by mechanism to be described.

The cutter carriage 62 has upon it a cross-bar, 68, similar to the cross-bars 40, 41 and 42, and a screw-shaft, 67, similar to the screw-shaft 43, and a cutter-frame, 66, similar to the cutter frames 45, 46, 47 and 48; having a cutting tool, 69, secured therein and with adjusting devices thereon. There may be only one of these cutter frames but there may be and preferably is a series of them; I have shown in this illustration of my invention two transverse cutters, as appears from Fig. 2.

Figure 5:
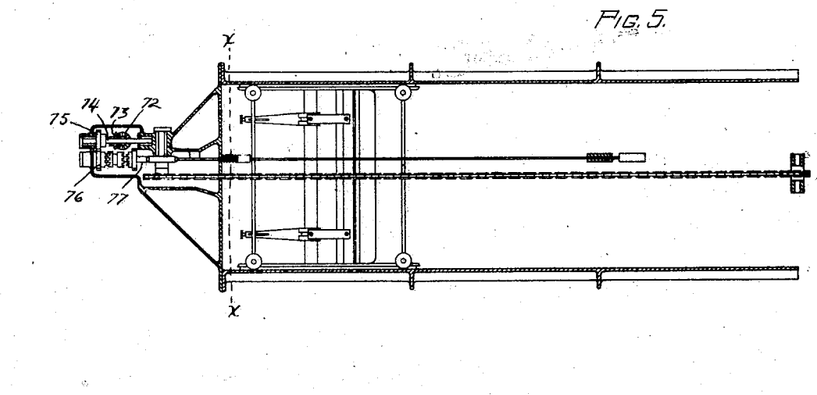
Fig. 5 is a horizontal section through the transverse cutting mechanism, showing most of the devices in plan and in part in elevation.
Figure 20:
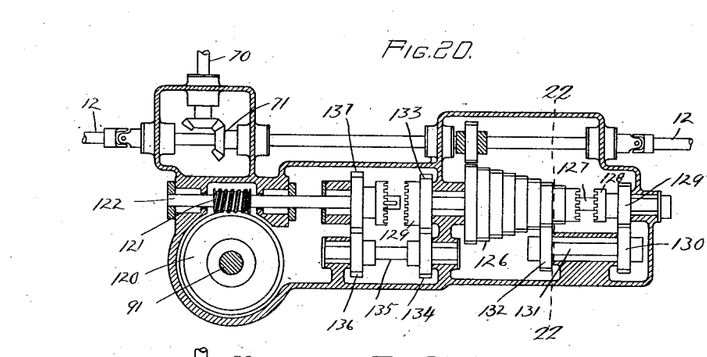
Fig. 20 is an elevation, partly in section, of the variable speed mechanism for the index-wheel for timing the operation of the transverse cutter.

The cutter frame or longitudinal cutter does not need to have means for raising and lowering the cutter to and from the glass, but the transverse cutter has such raising and lowering devices—as hereinafter described. The drive mechanism for the cutter carriage gets its power from the shaft 12, as shown in Fig. 20, to a vertical shaft, 70, through beveled gears, 71. At the upper end of the shaft 70 is a beveled gear wheel, 72, (Fig. 5) meshing with a beveled pinion, 73, on a horizontal shaft, 74. On this shaft 74 is a spur-gear, 75, meshing with a spur-gear, 76 (Fig. 5) loose on a shaft, 77, The spur-gear 75 also meshes with a spur-gear, 78, on a shaft, 79, which at its opposite end has a spur-gear, 80, meshing with a spur-gear, 81, loose on the shaft 77. On the shaft 77 between the hubs of the spur-gears 76 and 81 is a double clutch, 82, there being complementary clutch-members on the hubs of the gear-wheels 76 and 81. This clutch is adapted to be moved by a mechanism to be described, so as to couple either gear-wheel to the shaft 77, the clutch 82 being splined to the shaft.

On the shaft 77 is a worm, 83, which engages a worm-wheel, 84, on the shaft 65, which shaft also carries the sprocket-wheel over which passes the sprocket-chain 63, previously described.

Figure 1:
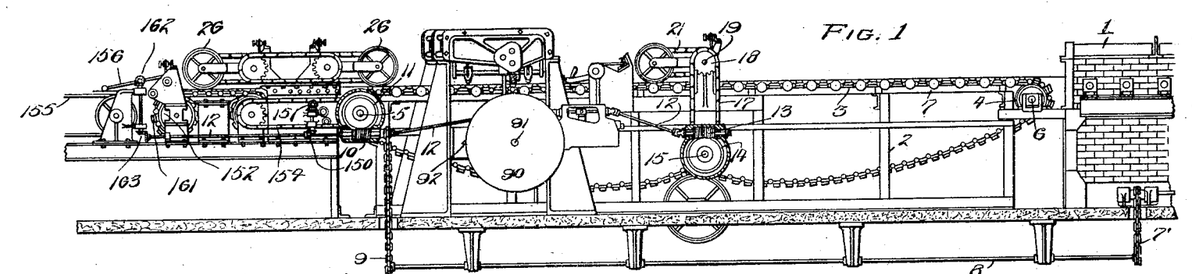
Figure 1 is a side elevation of my cutting machine, showing at the right hand end the leer from which the drawn sheet is continuously fed and which in turn communicates with the drawing mechanism (not shown), parts being broken away.

The operating mechanism for the double clutch 82 is shown particularly in Figs. 1 and 4, and comprises a cam disk, 90, fixed to a shaft, 91, this cam disk having a collar or lug, 92, which is adapted to engage the spring-actuated latch, 93 (Fig. 4) in each revolution of the disk 90; this latch being held down on the periphery of the wheel normally by a spring, 94. This spring latch 93 has a detent, 95, which holds a lever, 96, the upper end of which engages the double clutch. When the detent 95 is lowered by means of the lug 92 lifting the opposite end of the latch 93, a spring, 97, on a connecting-rod, 98, bearing against the lever 96 moves the clutch 82 into engagement with the hub of the gear-wheel 76 and causes the shaft 77 to turn in the proper direction to drive the sprocket-chain, which will carry the cutter to the right across the glass sheet, as shown in Fig. 4.

When the cutter carriage approaches the end of its travel across the sheet, a lug, 99 (Figs. 14 and 15) carried by the cutter carriage will strike a spring, 100, on a rod, 101, which is disposed above the cutter carriage and journaled in suitable bearings and at its left-hand end (Fig. 4) is connected to a lever, 102. This rod is held from longitudinal movement while the spring 100 is being compressed by the movement of the cutter carriage by reason of a collar, 103, bearing against a latch, 104, pivoted to the stationary frame—as shown at the right of Fig. 4. When this spring has been compressed a sufficient distance a roller, 105, on the lug 99 will strike an inclined bearing, 106, on the latch and lift the latch out of engagement with the shoulder, as shown in Fig. 14, shifting the lever 102 to the right and likewise rocking the lever 96 and moving the double clutch 82 out of engagement with the hub of the gear-wheel 76 and into engagement with the hub of the gear-wheel 81. This being driven in the reverse direction by the gears shown in Fig. 4 will cause the carriage to move in the reverse direction.

In order to hold the lever 102 in its adjusted position during this reversal of the carriage, the rod 101 is provided with a notch, 107, on its under face, which, when the spring acts as shown in Fig. 14, is engaged by the toothed pawl, 108, which pawl is pivoted at 109 on the stationary frame. As the carriage reaches the end of its return movement, a shoulder 110, carried on the carriage, strikes a block, 111, sliding on the rod 101 and secured to a rod, 112, which extends parallel with the rod 101 and at its outer end is pivoted to the pawl 108. This will disengage the pawl 108 from the notch 107 and release the lever 102, when the spring 97 will throw the double clutch 82 to its neutral position as shown in Fig. 4.

Figure 6:
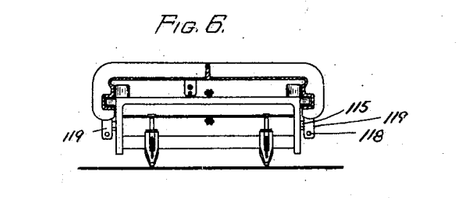
Fig. 6 is a vertical section through the transverse cutter, on line 6—6 of Fig. 5.
Figure 7:
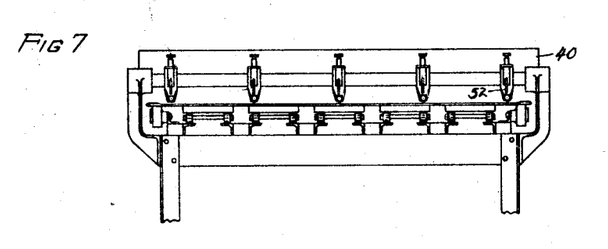
Fig. 7 is a vertical section through the feed table, on line 7—7 of Fig. 3.

As the cutter carriage 62 returns across the sheet in this embodiment of my invention the cutter is not intended to operate to cut the sheet, and therefore the cutter must be lifted out of engagement with the sheet in the return movement. This I have shown as effected by means of a sliding wedge, 115, operating in guides on the under face of the cross-bar 68. As the cutter frame moves to the right (Fig. 4) this sliding wedge strikes an adjustable stop, 116, moves the wedge underneath the roller, 117, on the end of the arm 114 of the cutter frame and lifts the cutter above the glass sheet. It is held in this raised position during the return movement, and the wedge is moved out so as to lower the cutter by providing any suitable stop for the wedge to strike. I have shown the bar which carries the wedge 115 as extending at both ends (Fig. 6) and adapted to strike an adjustable pin, 118, carried on brackets, 119, depending from the sides of the stationary frame.

Figure 21:
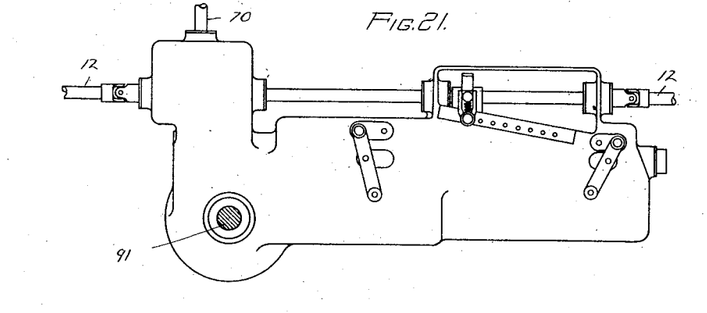
Fig. 21 is a side elevation thereof.
Figure 22:
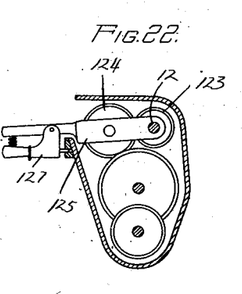
Fig. 22 is a section on line 22—22 of Fig. 20.

Inasmuch as it is desirable to vary the intervals between the cutting action of the glass cutter, I provide a variable gear drive for the cam disk 90, which, as before described, is on the shaft 91. I have shown a form of variable drive gear for this shaft 91 in Figs. 20, 21 and 22. On the shaft 91 there is a worm-wheel, 120, which is driven by a worm, 121, on a shaft 122. Any suitable variable speed mechanism for driving the shaft 122 may be employed; the specific mechanism I have shown comprises a sliding gear-wheel, 123, on the shaft 12, which meshes with a gear-wheel, 124, carried on the lever, 125, which gear-wheel is adapted to be meshed with any one of the cone gears, 126; a suitable locking device, 127, being provided for holding the gears in mesh after any desired adjustment. The cone gears 126 are loose on a shaft, 127', and may be coupled to the shaft by means of a clutch, 128; and the shaft 127' may be coupled to the shaft 122 by a clutch, 129, in which case the drive is direct through the gear-wheel 124 and the selected cone gear 126 to the shaft 122 and the worm-wheel 120. If it is desired to get any other adjustment it may be effected by withdrawing the clutch, 128, which carries on its hub a gear-wheel, 129', and meshing that gear-wheel with a gear-wheel, 130, on a shaft 131, which at its opposite end has a gear-wheel, 132, meshing with one of the cone gears 126; the gears 132 and 130 being of different size. With this arrangement the drive is through the cone gears, the gear 132, the shaft 131, the gears 130, 129, which, being keyed to the shaft 127' by the clutch 128 would drive the clutch 129—which might be clutched directly to the shaft 122. Another variation may be obtained by having on the hub of the clutch 129 a gear-wheel, 133, which can mesh with a gear, 134, on a shaft, 135, which carries at the other end a gear, 136, meshing with a gear, 137, on the shaft 122. By this gear train or by any other suitable gear train, or by other suitable means, the cam disk 90 can be given a variable speed and thus the desired timing obtained for the actuation of the transverse cutter.

Beyond the cross-cutter is another cross-shaft 15ª, with sprocket-wheels driving the drive-wheels 26, the construction being the same as that described for the drive-wheels in advance of the longitudinal cutter. These second drive - wheels are located substantially at the end of the main feed-table and are driven from the shaft 5 by means of a sprocket-chain, 140 (Fig. 2); and beyond the end of the main feed table is a series of roll supports, 141, which may be idler rolls, as shown, or, if desired, may be driven.

Figure 3:
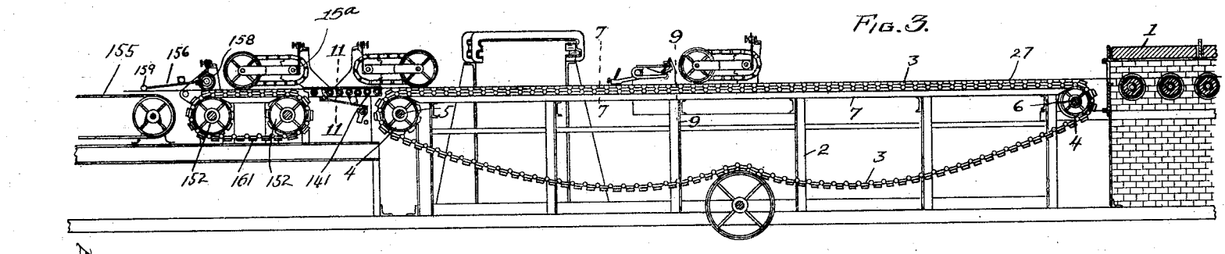
Fig. 3 is a vertical central longitudinal section on Fig. 2.

At this point I preferably provide means for cracking the sheet along the longitudinal cuts. This I have accomplished by a series of hammers, which may be of the construction shown in Figs. 3 and 13, in which there are spring arms, 142, each carrying at its free end a head, 143, which may be of metal. Surrounding this head is a circular spring, 144, the ends of the same being secured to the head, 143, and leaving the circular portion looped around the end of the head, normally slightly free therefrom. The other end of the spring arm 142 is secured to a collar, 145, slidably supported on a shaft, 146, which is arranged transverse of the machine in suitable stationary supports. The collar is secured upon the shaft 146 by means of a spring-back, 147, and may be firmly locked by a set-screw, 148.

Arranged across the machine is a shaft having upon it a double cam, 149 (Fig. 13), which shaft is constantly rotated to retract the hammer from the glass and allow it to strike the glass at the cut, thus causing the breaking of the sheet along the longitudinal cut lines. This cam shaft is driven from the shaft 12 through beveled gears, 150, and beveled gears, 151.

Beyond the rollers 141 is an auxiliary feed table, 161, being an endless chain of the same construction as the chain 3, passing over sprocket-wheels, 152, which may be driven from the shaft 5 by means of a sprocket-chain, 154. Above the auxiliary feed table is another set of drive wheels 26 of the same construction as the other two sets previously described.

In order to break the sheet on the transverse cuts I provide a flexible belt or feed-table, 155, arranged on a lower plane than the plane of the upper surface of the auxiliary feed-table, so that as the sheet is fed off of the auxiliary table it will extend unsupported for a distance over the feed belt or feed-table, 155, as shown at the left-hand of Fig. 2. I provide means for pressing down upon the unsupported end of the sheet, which pressure will break the sheet along the transverse cuts. This pressing means I have shown as comprising spring arms, 156 (Figs. 1, 2 and 12), which are supported on a cross-shaft, 157, upon which is an idler pressure roll, 158, which may have suitable means for applying pressure thereto. These spring arms 156 have at their outer ends felt-faced rollers, 159, and these rollers are pressed down by means of a cam shaft, 160, which I have shown as a squared shaft driven from the shaft 12 by the beveled gears, 163, 162 (Fig. 1). The rotation of the shaft 160 causes a vibration of the spring arms 156 which transmit a pulsating pressure through the rollers 159 to the projecting sheet of glass.

Beyond the end of the auxiliary feed-table is an idler roll, 165, over which the sheet passes and which forms the breaking fulcrum for the sheet.

From the description given it will be obvious that as the sheet passes over the feed-table longitudinal cuts will first be made in it; then transverse cuts, at any desired spaced relation; then the hammers, 142, 143 and 144, will break the sheet along the longitudinal cuts, thus dividing it into strips; and as the sheet passes off of the auxiliary feed table the strips will be broken along the line of the transverse cuts, thus separating the sheet into the desired size, ready for packing.

Having thus described my invention, what I claim as new and desire to secure by Letters Patent is:

1. In a glass cutting device, the combination of a traveling cutting table providing a broad supporting surface to underlie and support the sheet of glass substantially throughout its width, driven pressure rolls having narrow treads to bear on the upper surface of the glass on the table and exerting a driving force on the glass, and stationary scoring cutters bearing on the glass adjacent to the pressure rolls, whereby the glass is cut longitudinally as it passes along the cutting table.

2. In a glass cutting device, the combination of means for continuously feeding a sheet of glass longitudinally, and means to produce a checkered scoring of the sheet; said scoring means comprising stationary cutters arranged at intervals across the sheet and bearing against its surface, the cutters operating continuously to cut the sheet longitudinally into a series of strips, transverse cutting means, and mechanism for moving the transverse cutting means across the sheet while the sheet is advancing and scoring or cutting each strip into individual plates or panes.

3. In a glass cutting device, the combination of means for feeding a sheet of glass longitudinally, means for scoring it in checkers comprising means to score it longitudinally as it is fed, automatic means for scoring the sheet transversely at regularly-spaced intervals, and mechanical devices operating concomitantly with the scoring means for automatically cracking the glass along the longitudinal and transverse scores.

4. The combination with mechanism for feeding continuously a sheet of glass, of mechanism operating continuously for scoring the sheet longitudinally, mechanism operating intermittently to score the sheet laterally, and automatic means operable as the sheet advances to break it along said longitudinal and lateral scores, whereby the sheet is broken into a series of rectangles of predetermined size.

5. The combination with mechanism for feeding continuously a sheet of glass, of automatic mechanism for scoring the sheet longitudinally and laterally and breaking the sheet at the scores into a series of rectangles of predetermined size.

6. The combination with mechanism for feeding continuously a sheet of glass, of mechanism for cutting the sheet longitudinally and laterally and hammers for striking the sheet adjacent the longitudinal cuts to sever the same along the cuts.

7. The combination with a feed table for feeding a sheet of glass across and beyond the table, of means for cutting the sheet transversely at stated intervals, a support at a lower level beyond the feed-table, presser arms arranged to automatically depress the outer unsupported end of the sheet as the transverse cut leaves the end of the feed table, and means to cause a pulsating pressure of said arms against the sheet for the purpose described.

8. The combination with mechanism for feeding a sheet of glass of mechanism for cutting the sheet into strips and for cutting the strips transversely and means for cracking the sheet along the longitudinal and transverse cuts.

9. The combination with a feed-table for a glass sheet, of mechanism for cutting the sheet into strips, for cutting the strips transversely and for cracking the sheet along the longitudinal cuts and means for depressing the sheet beyond the end of the table to crack the strips along the transverse cuts.

10. In a glass cutting machine for sheet glass the combination of a driven feed table, a transversely moving cutter, means for intermittently actuating the cutter, automatic means for throwing the feed mechanism for the cutter into operation after fixed lengths of glass have been fed beneath the cutter and means for varying the interval between cutting operations.

11. In a glass cutting machine for sheet glass, the combination of a driven feed table, a transversely moving cutter, a device for intermittently actuating the cutter, an index wheel for throwing the cutter-operating device into action, and a variable speed drive for said wheel adjustable to vary the intervals between operations of the cutter and thereby vary the distance between successive transverse cuts.

12. In a sheet glass cutting machine the combination of two separated feed tables, means for making longitudinal cuts on the glass as it is fed and hammers for cracking the glass along the cut, arranged between the two tables.

13. In a sheet glass cutting machine the combination of a driven feed table, separated rolls beyond the table, over which the sheet travels, means for moving the sheet longitudinally on the table, the sheet having scored lines extending in the direction of travel and hammers between the rolls for cracking the sheet along the scored lines.

14. In a sheet glass cutting machine the combination of two driven feed tables, separated rolls between the tables, means for scoring the sheet longitudinally, hammers between the rolls, adapted to strike the sheet to crack it along the scored lines, and power operated presser rolls at the end of the first table and over the second table.

15. In glass cutting apparatus, the combination with means for supporting a sheet of glass, of a scoring device, means to cause a relative movement of the glass and scoring device and thereby score the glass, and means operable to crack the glass along the score during the scoring operation.

16. In glass cutting apparatus, the combination of a device for scoring a sheet of glass, and means operating concomitantly with the scoring operation to crack the glass along the score.

17. In glass cutting apparatus, the combination with a scoring device, of means to hold said device on the surface of a sheet of glass and cause relative movement of the glass and scoring device to thereby score the glass, and a means operable automatically to impart a series of taps or blows along the score to crack the glass during the scoring operation.

18. In glass cutting apparatus, the combination with means to continuously feed a sheet of glass, a stationary scoring device in engagement with the sheet for scoring it, and means in advance of the scoring device for automatically cracking the glass along the score during the scoring operation.

19. In glass cutting apparatus, the combination with means to continuously feed a sheet of glass, a stationary scoring device in engagement with the sheet for scoring it, and means in advance of the scoring device for automatically cracking the glass along the score, said means comprising a hammer, and means to intermittently actuate the hammer and cause it to strike on the surface of the glass along the score.

20. The combination with means for continuously advancing a sheet of glass, of a series of scoring devices located at intervals transversely of the sheet and operable continuously to produce a series of scores lengthwise of the sheet, and cracking devices in advance of the scoring devices and operable concomitantly with the scoring devices to crack the sheet into longitudinal strips.

21. The combination with means for continuously feeding a sheet of glass horizontally, of a stationary scoring device bearing against the upper surface of the glass and thereby scoring it longitudinally, a cracking device beneath the sheet of glass, and means to cause such cracking device to strike upwardly at intervals against the under surface of the glass along the score and thereby crack the glass along the score.

22. Means for cracking a scored sheet of glass, comprising a hammer or striking device, means for causing a relative travel of the sheet of glass and cracking device in the direction in which said score extends, and means to cause the striking device to impart a series of taps or blows against the surface of the glass during said travel and thereby crack the glass along said score.

23. Means for cracking a scored sheet of glass, comprising a hammer or striking device, means for causing a relative travel of the sheet of glass and cracking device in the direction in which said score extends, and means to cause the striking device to impart a series of taps or blows against the surface of the glass during said travel and thereby crack the glass along said score, and a scoring device operating simultaneously with said cracking device to produce said score.

24. In glass handling apparatus, means for cracking or breaking a scored sheet of glass along the score; comprising a cracking device, means causing a movement thereof relative to the glass along the score, and means causing said device to apply a cracking force to the glass intermittently at intervals along the score and thereby lengthen the crack step by step along the score.

25. The combination with means for supporting a scored sheet of glass having parallel scores, of means for cracking or breaking the glass along the scores, comprising cracking devices, means for causing a relative movement of said devices and glass along the scores, and means to cause an intermittently applied breaking action of said devices on the glass during said movement to crack or break the glass step by step.

26. The combination of a scoring device and operating means therefor to score a sheet of glass, and a cracking device coöperating therewith to crack the sheet along the score simultaneously with the operation of the scoring device, said cracking device comprising a hammer or tapper positioned to operate on the opposite surface of the sheet from the score, and means to cause said hammer to impart a series of blows to the glass.

27. The combination with means for continuously feeding a sheet of glass, of a stationary scoring device by which the sheet is scored longitudinally as it advances, and a cracking device beyond said scoring device and operating at intervals during the scoring operation to crack the glass along the score.

28. The combination with means for feeding a sheet of glass continuously, of a series of scoring devices at different positions transversely of the sheet and operable to produce a series of scores along the sheet as it advances, and a series of cracking devices arranged beyond the scoring devices and operable during the scoring operation to crack the glass along said scores, whereby the sheet is broken into a series of longitudinal strips.

29. The combination with means for feeding a sheet of glass continuously, of a series of scoring devices at different positions transversely of the sheet and operable to produce a series of scores along the sheet as it advances, and a series of cracking devices arranged beyond the scoring devices and operable to crack the glass along said scores, whereby the sheet is broken into a series of longitudinal strips, and automatic means located beyond said cracking devices for scoring the glass transversely at predetermined intervals.

30. The combination with means for supporting a scored sheet of glass, of a cracking device comprising a hammer on the opposite side of the sheet from said score, means for causing a relative travel or movement of the sheet and hammer in the direction in which said score extends, a spring arm carrying said hammer, and means to withdraw and release said arm and hammer at intervals and thereby cause the hammer to impart a series of taps to the glass along said score for cracking the glass.

31. The combination with means for supporting a scored sheet of glass, of a cracking device comprising a hammer on the opposite side of the sheet from said score, means for causing a relative travel or movement of the sheet and hammer in the direction in which said score extends, a spring arm carrying said hammer, and actuating means for said hammer, comprising a rotating shaft and a cam on said shaft for intermittently withdrawing the hammer and permitting it by means of the resiliency of said arm to strike against the glass adjacent said score.

32. The combination with a table, of means for feeding a sheet of glass continuously thereover, a series of scoring devices located at intervals transversely of the table and operable to produce a series of scores extending lengthwise of the sheet, means for cracking the sheet along said scores, comprising a series of hammers individual to said scores and located beneath the sheet and in advance of the scoring devices, arms carrying said hammers, a rotary shaft, and cams thereon to actuate said arms and cause the hammers to intermittently strike the under surface of the glass along the scores and thereby crack the glass.

33. The combination of means for continuously feeding a sheet of glass having transverse scores at intervals across its upper surface, said means comprising a table over which the glass is advanced, a breaking device positioned to engage the upper surface of the glass adjacent its free end at a point beyond the table, and means to impart an intermittent downward pressure of said device on the glass to break it along said scores, said means comprising spring arms, a rotary cam shaft, and cams on said shaft to bear against said arms with an intermittent pressure.

34. The combination with a horizontal feed table and means coöperating therewith to continuously feed a sheet of glass over said table, said glass having transverse scores at intervals therealong, a conveyer at the end of said table and at a lower plane than the table so that the free end of the glass as it passes beyond the table projects over said conveyer but out of contact therewith, and means for automatically breaking the glass along said scores as the latter reach the end of said table, whereby the glass is separated into sections and dropped onto said conveyer.

35. The combination with a horizontal feed table and means coöperating therewith to continuously feed a sheet of glass over said table, said glass having transverse scores at intervals therealong, a conveyer at the end of said table and at a lower plane than the table so that the free end of the glass as it passes beyond the table projects over said conveyer but out of contact therewith, and means for automatically breaking the glass along said scores as the latter reach the end of said table, whereby the glass is separated into sections and dropped onto said conveyer, said breaking means comprising spring arms projecting over said free end of the glass, a cam shaft extending transversely of the sheet over said arms, and means for rotating said shaft and causing the cams to impart an intermittent downward pressure on the spring arms.

36. The combination with means for feeding a sheet of glass longitudinally, of a scoring device, means for driving said scoring device transversely of the sheet during said feeding movement, the speed of the scoring device bearing a fixed ratio to that of the sheet, the direction of movement of the scoring device being inclined toward the direction of travel of the glass at an angle to compensate for the movement of the glass, whereby the score is perpendicular to the direction of travel of the glass, means for returning the scoring device, a controlling device operable at predetermined time intervals to start the scoring device, and adjusting means for varying said time intervals to thereby vary the distance between said scores.

37. The combination with means for feeding a sheet of glass, of a scoring device, means for moving said scoring device across the sheet, automatic means for setting the scoring device in operation at predetermined time intervals, and adjusting means for varying said time intervals and thereby varying the distance between the scores.

38. The combination with means to score a web of glass longitudinally, of means to score the longitudinally scored portion transversely, and means operating on the longitudinally and transversely scored portion of the web to crack the glass along the longitudinal scores.

39. The combination with means to score a web of glass longitudinally, of means to score the longitudinally scored portion transversely, and means operating on the longitudinally and transversely scored portion of the web to crack the glass along the longitudinal scores, and means to break the cracked strips along the transverse scores, whereby the web is divided into rectangular sections or plates.

40. The combination with means for continuously feeding a web of glass, of a series of scoring devices located at different positions transversely of the web and operable continuously to score the web as it advances, a transverse scoring device in advance of the first mentioned scoring devices and operable to produce transverse scores at intervals along the longitudinally scored portion of the glass, means in advance of said transverse scoring device for cracking the glass along the longitudinal scores, and means in advance of said cracking device to break the glass along the transverse scores, whereby the web is divided into rectangular sections.

41. The combination with means for feeding a sheet of glass, of a scoring device, means for moving said scoring device across the glass in a direction transverse to that in which the glass is fed, said means comprising a gear train having a driving element in continuous operation while the glass is being fed, a reversing clutch between said element and the scoring device, and means for automatically actuating the reversing clutch.

42. The combination with means for feeding a sheet of glass, of a scoring device, means for moving said scoring device across the glass in a direction transverse to that in which the glass is fed, said means comprising a gear train having a driving element in continuous operation while the glass is being fed, a reversing clutch between said element and the scoring device, automatic means for shifting the reversing clutch into positions for advancing and returning the scoring device and for moving the clutch to a neutral position so that the scoring device is at rest, and a starting device operable automatically at predetermined time intervals for moving the clutch to operative position, and adjusting means to vary said time intervals and thereby vary the distance between successive scores.

43. The combination with means for feeding a sheet of glass, of a scoring device movable transversely of the sheet for producing transverse scores at intervals along the sheet, a gear train through which motion is transmitted to the scoring device, comprising a reversing clutch, means for holding said clutch in an intermediate position in which the scoring device is disconnected from its drive, a starting device for actuating the clutch at predetermined intervals to start the scoring device, and means for adjusting said timing device to vary the time intervals between successive operations of the scoring device.

44. The combination with means for feeding a sheet of glass, of a carriage, a scoring device thereon, a track on which the carriage is mounted to travel transversely of the direction in which the sheet of glass is fed, a flexible driving element forming with the carriage an endless driver, and means for intermittently driving said element in opposite directions to reciprocate the carriage.

45. The combination with means for feeding a sheet of glass, of a carriage, a scoring device thereon, a track on which the carriage is mounted to travel transversely of the direction in which the sheet of glass is fed, a flexible driving element forming with the carriage an endless driver, a reversing clutch controlling the direction in which the carriage is driven, a controller for the reversing clutch operable at predetermined intervals to start the carriage, and adjusting means to vary said intervals and thereby vary the distance between the scores.

46. The method which consists in extending a score along a sheet of glass and concomitantly applying breaking stress progressively along the score as the latter is extended, and thereby causing the glass to break during the scoring operation.

47. The method of breaking glass, which consists in producing a score along the surface thereof, and applying a series of taps or hammer blows progressively along the score while the latter is being extended and thereby progressively cracking the glass along the score.

48. The method of separating a sheet of glass into strips, which consists in simultaneously extending a series of parallel scores along the glass, and cracking the glass along the scores by a series of hammer blows or taps progressively applied along each score as the latter is extended, so that the scoring and cracking progress concurrently along the sheet.

49. The method of cracking glass, which consists in extending a score along the surface thereof, and concomitantly applying a series of taps or blows progressively along the score at a substantially constant distance from the point to which the score has been extended, thereby progressively cracking the glass along the score.

In testimony whereof I affix my signature.

JOSEPH P. CROWLEY.